US012386396B2

(12) United States Patent
Kinoshita et al.

(10) Patent No.: US 12,386,396 B2
(45) Date of Patent: Aug. 12, 2025

(54) ELECTRONIC APPARATUS

(71) Applicant: LENOVO (SINGAPORE) PTE. LTD., Singapore (SG)

(72) Inventors: Hiroaki Kinoshita, Yokohama (JP); Yalu Liu, Yokohama (JP); Takayuki Morino, Yokohama (JP); Daisuke Takahashi, Yokohama (JP); Keita Suzuki, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 182 days.

(21) Appl. No.: 18/469,830

(22) Filed: Sep. 19, 2023

(65) Prior Publication Data

US 2024/0211000 A1      Jun. 27, 2024

(30) Foreign Application Priority Data

Dec. 21, 2022   (JP) ................. 2022-204886

(51) Int. Cl.
*G06F 1/16*        (2006.01)

(52) U.S. Cl.
CPC .......... *G06F 1/1656* (2013.01); *G06F 1/1681* (2013.01)

(58) Field of Classification Search
CPC combination set(s) only.
See application file for complete search history.

(56) References Cited

U.S. PATENT DOCUMENTS

| | | | |
|---|---|---|---|
| 10,901,464 B2* | 1/2021 | Seo | G06F 1/1652 |
| 11,723,170 B2* | 8/2023 | Ohyama | G06F 1/1681 |
| | | | 361/679.27 |
| 11,758,672 B2* | 9/2023 | Morino | G06F 1/1681 |
| | | | 361/807 |
| 2022/0232729 A1* | 7/2022 | Ohyama | G06F 1/1681 |
| 2023/0266803 A1* | 8/2023 | Takahashi | G06F 1/1652 |
| | | | 361/679.27 |
| 2023/0288967 A1* | 9/2023 | Takahashi | G06F 1/1616 |
| 2023/0297144 A1* | 9/2023 | Kinoshita | H04M 1/0266 |
| | | | 361/679.01 |
| 2023/0305602 A1* | 9/2023 | Miyamoto | G06F 1/1616 |
| 2024/0134415 A1* | 4/2024 | Ohyama | H05K 7/20472 |
| 2024/0211000 A1* | 6/2024 | Kinoshita | G06F 1/1616 |
| 2024/0231427 A9* | 7/2024 | Ohyama | G06F 1/1683 |

FOREIGN PATENT DOCUMENTS

JP      2021015522 A    2/2021

* cited by examiner

*Primary Examiner* — Lisa Lea-Edmonds
(74) *Attorney, Agent, or Firm* — SHIMOKAJI IP (57) ABSTRACT

An electronic apparatus includes a hinge device that connects a first chassis member and a second chassis member to be relatively rotatable, a rear cover component that is disposed to fill a space between a first end portion of the first chassis member and a second end portion of the second chassis member separated from each other in a first posture, and a sheet member that has flexibility, is provided to straddle between the rear cover component and an inner surface of the first chassis member and an inner surface of the second chassis member, and covers a gap between the rear cover component and the first end portion and a gap between the rear cover component and the second end portion.

7 Claims, 6 Drawing Sheets

ELECTRONIC APPARATUS

BACKGROUND OF THE INVENTION

Field of the Invention

The present invention relates to an electronic apparatus in which chassis members are connected to each other by a hinge device.

Description of the Related Art

In recent years, electronic apparatuses such as PCs and smartphones that have a touch panel type liquid crystal display and do not have a physical keyboard are rapidly spreading. As this type of electronic apparatuses, for example, a configuration has been proposed in which chassis can be folded by using a flexible display configured with organic electro luminescence (EL) or the like (see, for example, Japanese Unexamined Patent Application Publication No. 2021-015522).

SUMMARY OF THE INVENTION

The electronic apparatus as described above includes a rear cover component that fills an opening between left and right chassis members that are greatly separated from each other in a state in which the chassis are folded. The rear cover component is accommodated inside the chassis members when the chassis are opened. Therefore, it is necessary to avoid the rear cover component from interfering with the left and right chassis members during the rotation operation, and it is necessary to secure a certain amount of gap for interference prevention between the rear cover component and each chassis member even in a state in which the chassis are folded. As a result, it has been found that in such an electronic apparatus, an internal component, for example, electronic components of a metal hinge device, is visible through the gap and thus the appearance quality is deteriorated.

The present invention has been made in consideration of the above problems of the related art, and an object of the present invention is to provide an electronic apparatus capable of suppressing deterioration in appearance quality.

An electronic apparatus according to a first aspect of the present invention includes a first chassis member that has an inner surface, a second chassis member that has an inner surface and is adjacent to the first chassis member, a hinge device that connects the first chassis member and the second chassis member to be relatively rotatable between a first posture in which the first chassis member and the second chassis member are stacked to overlap each other in a surface normal direction and a second posture in which the first chassis member and the second chassis member are aligned in a direction perpendicular to the surface normal direction, a rear cover component that extends along a first end portion of the first chassis member adjacent to the second chassis member and a second end portion of the second chassis member adjacent to the first chassis member, is disposed to fill a space between the first end portion and the second end portion separated from each other in the first posture, and is disposed to straddle the first end portion and the second end portion in the second posture, and a sheet member that has flexibility, is provided to straddle between the rear cover component and an inner surface of the first chassis member and an inner surface of the second chassis member, and covers a gap between the rear cover component and the first end portion and a gap between the rear cover component and the second end portion.

The above-described aspect of the present invention can suppress deterioration of appearance quality.

DETAILED DESCRIPTION OF THE INVENTION

An electronic apparatus according to the present invention will be described in detail below with preferred embodiments with reference to the accompanying drawings.

Figure 1:
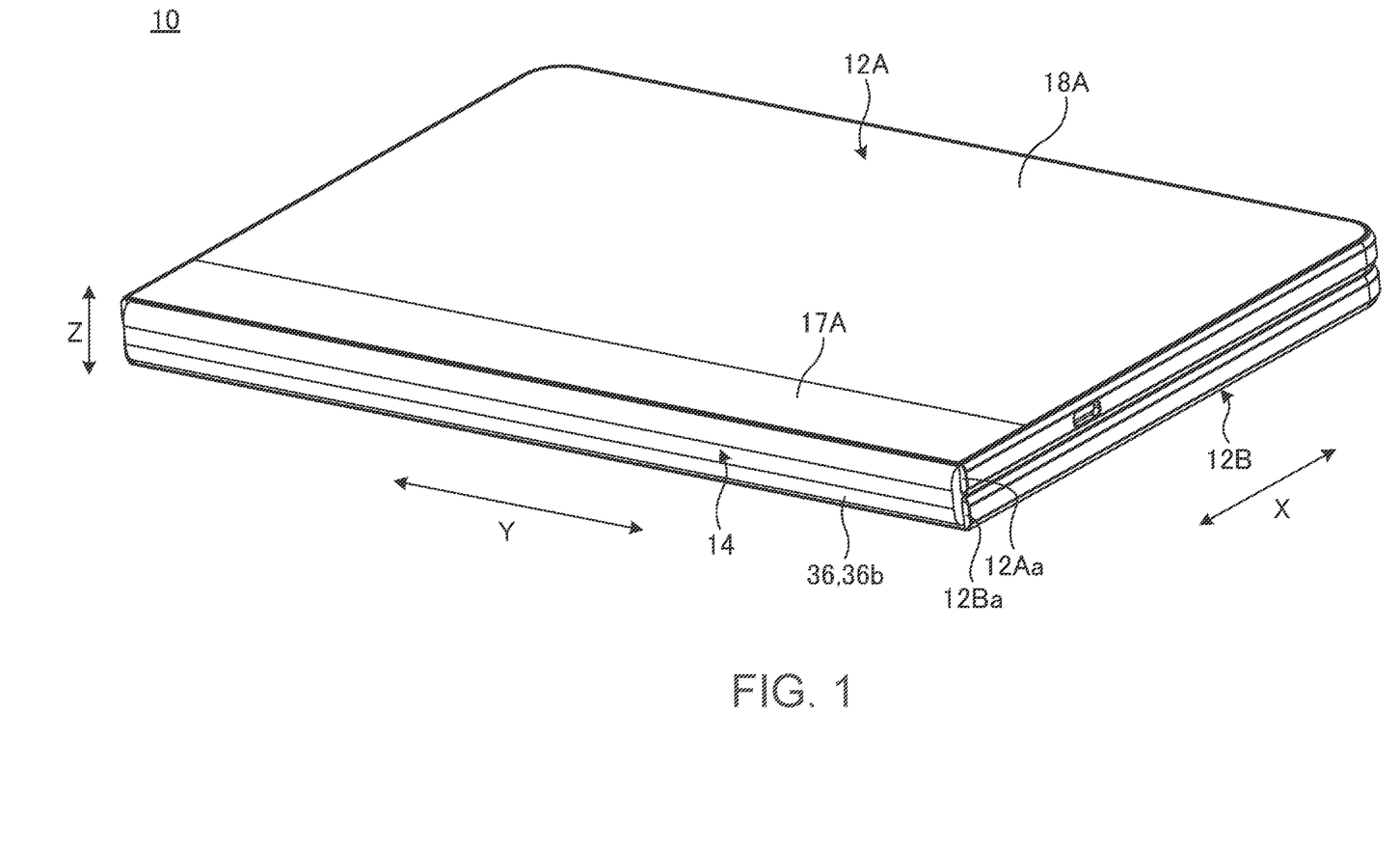
FIG. 1 is a perspective view illustrating a state in which an electronic apparatus according to an embodiment is closed and in a 0-degree posture.
Figure 2:
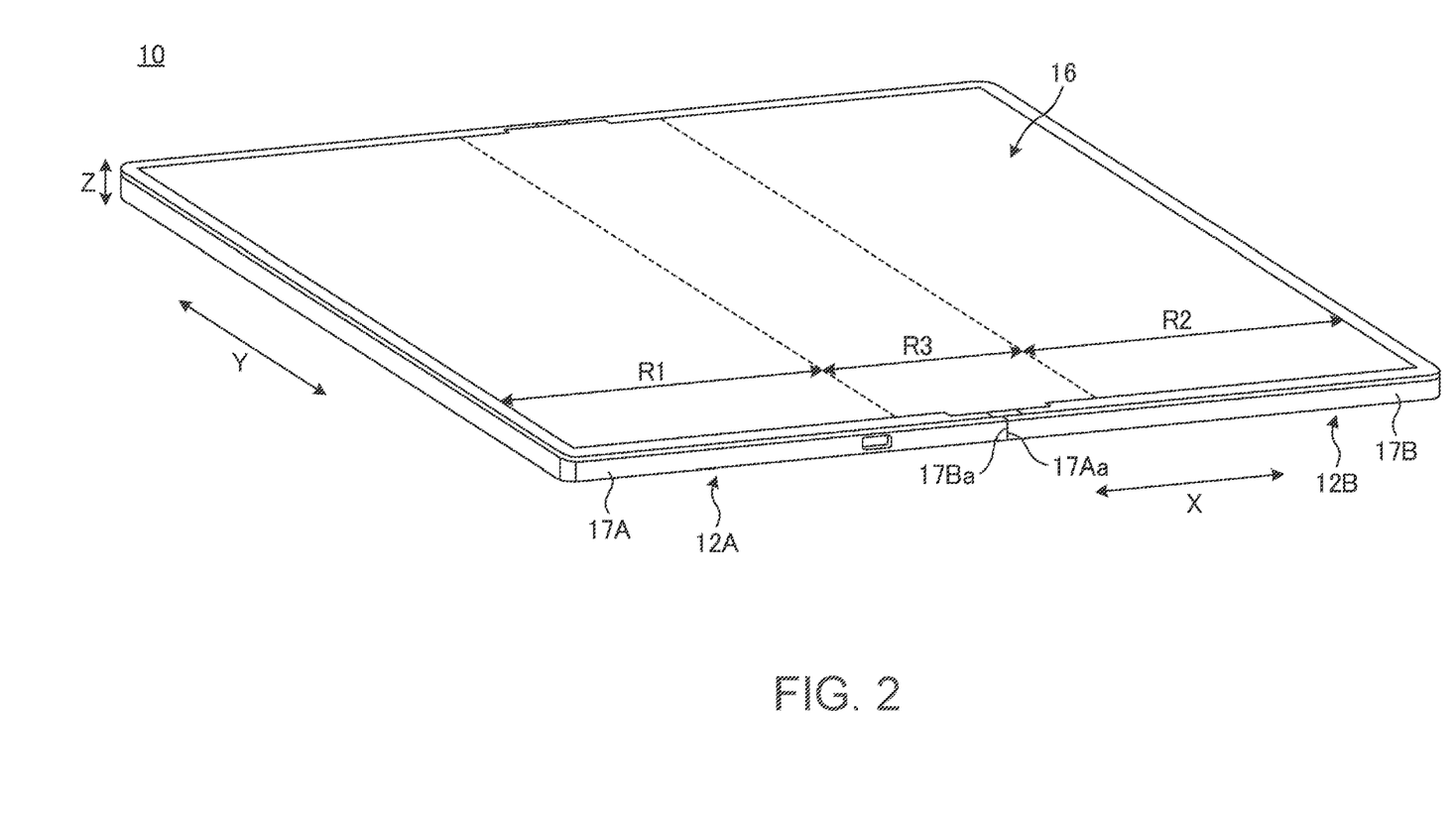
FIG. 2 is a plan view schematically illustrating a state in which the electronic apparatus illustrated in FIG. 1 is opened and in a 180-degree posture.
Figure 3:
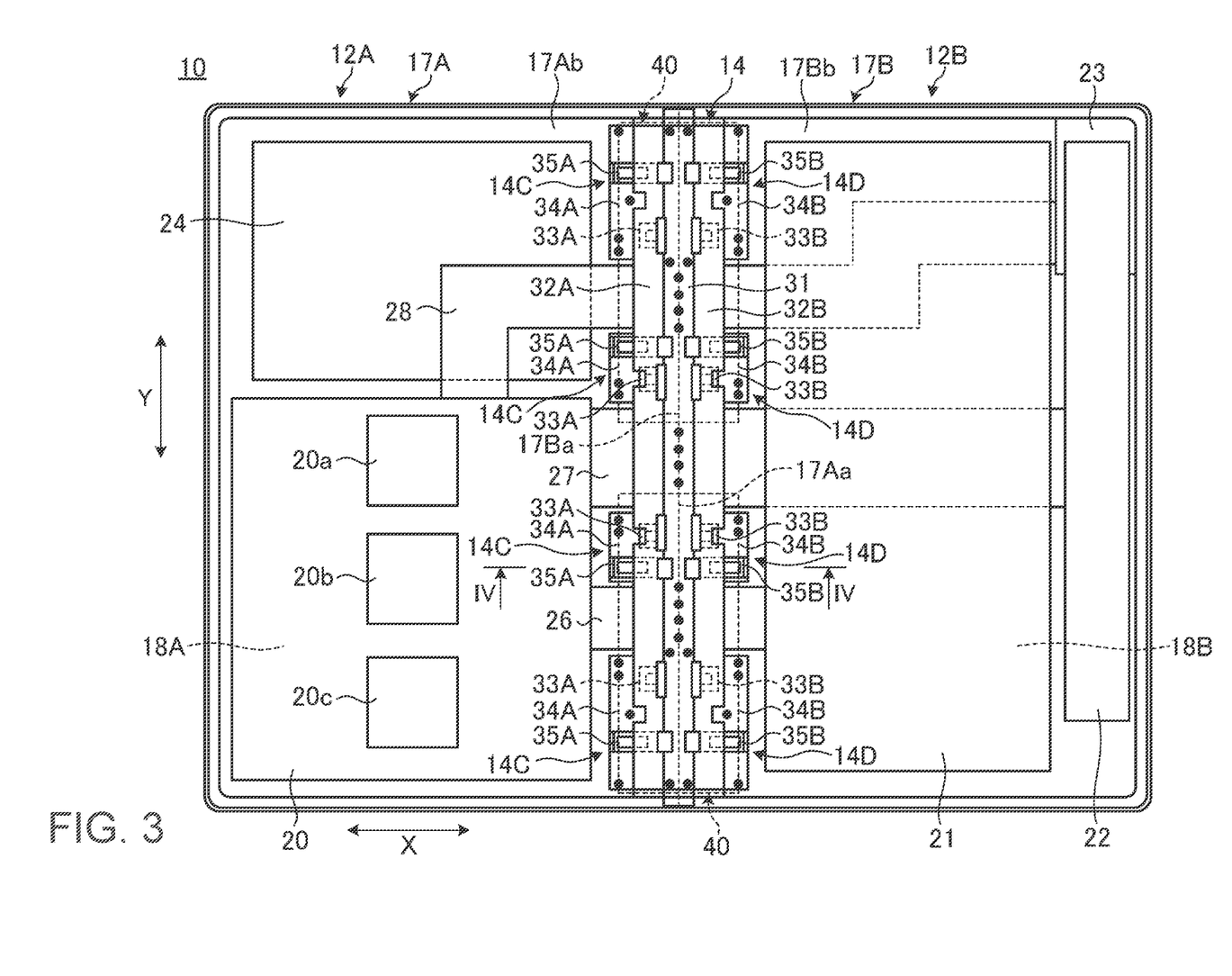
FIG. 3 is a plan view schematically illustrating an internal structure of the electronic apparatus illustrated in FIG. 2.

FIG. 1 is a perspective view illustrating a state in which an electronic apparatus 10 according to an embodiment is closed and in a 0-degree posture. FIG. 2 is a plan view schematically illustrating a state in which the electronic apparatus 10 illustrated in FIG. 1 is opened and in a 180-degree posture. FIG. 3 is a plan view schematically illustrating an internal structure of the electronic apparatus 10 illustrated in FIG. 2.

As illustrated in FIGS. 1 to 3, the electronic apparatus 10 includes a first chassis 12A, a second chassis 12B, a hinge device 14, and a display 16. The electronic apparatus 10 of the present embodiment exemplifies a tablet PC or a laptop PC that is capable of being folded like a book. The electronic apparatus 10 may be a smartphone, a portable game machine, or the like.

Each of the chassis 12A and 12B is disposed adjacent to each other. The first chassis 12A includes a first chassis member 17A and a first cover member 18A. The first chassis member 17A is a rectangular frame-shaped member having standing walls formed on three sides other than a first end portion 17Aa adjacent to the second chassis 12B. The first cover member 18A is a plate-shaped member that closes the rear opening of the first chassis member 17A (see also FIG. 4). Similarly, the second chassis 12B includes a second chassis member 17B that has standing walls formed on three sides other than a second end portion 17Ba adjacent to the first chassis 12A, and a second cover member 18B that closes a rear opening of the second chassis member 17B. The front openings of the chassis members 17A and 17B are closed with the display 16.

Each of the members 17A, 17B, 18A, and 18B is configured by, for example, a metal member such as stainless steel, magnesium, or aluminum, or a fiber-reinforced resin plate containing reinforcing fibers such as carbon fiber.

The hinge device 14 connects the chassis 12A and 12B so that the chassis are relatively rotatable between the 0-degree posture and the 180-degree posture. The hinge device 14 also functions as a rear cover that hides the gap between the end portions 17Aa and 17Ba formed in the 0-degree posture illustrated in FIG. 1. The display 16 extends over the chassis 12A and 12B.

Hereinafter, the electronic apparatus 10 will be described while the direction in which the chassis 12A and 12B are aligned is called an X direction, the direction along the end portions 17Aa and 17Ba orthogonal to the X direction is called a Y direction, and the thickness direction of the chassis 12A and 12B is called a Z direction. Further, the angular posture between the chassis 12A and 12B will be described while a state in which the chassis 12A and 12B are stacked to overlap each other in the surface normal direction is called the 0-degree posture (see FIG. 1), and a state in which the chassis 12A and 12B are aligned in a direction perpendicular to the surface normal direction (X direction) is called the 180-degree posture (see FIG. 2). It is possible to call the posture between 0 and 180 degrees by appropriately carving the angle, and for example, a state in which the surface normal directions of the chassis 12A and 12B are orthogonal to each other is a 90-degree posture. These angles are for convenience of description, and the actual product may of course have angular positions slightly deviated from the exact angular positions indicated by angle numbers.

As illustrated in FIG. 3, a motherboard 20 is mounted on the first chassis 12A. Electronic components, for example, a central processing unit (CPU) 20a, a communication module 20b, a solid state drive (SSD) 20c, or the like are mounted on the motherboard 20. Various electronic components other than the motherboard 20 are mounted on the first chassis 12A.

A battery device 21, a display board 22, and a sub card 23 are mounted on the second chassis 12B. The display board 22 is a control board of the display 16. The sub card 23 is a board on which, for example, a power button, an external connector conforming to a universal serial bus (USB) standard, or the like is mounted. The battery device 21, the display board 22, and the sub card 23 are connected to the motherboard 20 by using respective flexible boards 26, 27, and 28, which straddle the end portions 17Aa and 17Ba. Various electronic components other than the battery device 21 or the like are mounted on the second chassis 12B.

Figure 4:
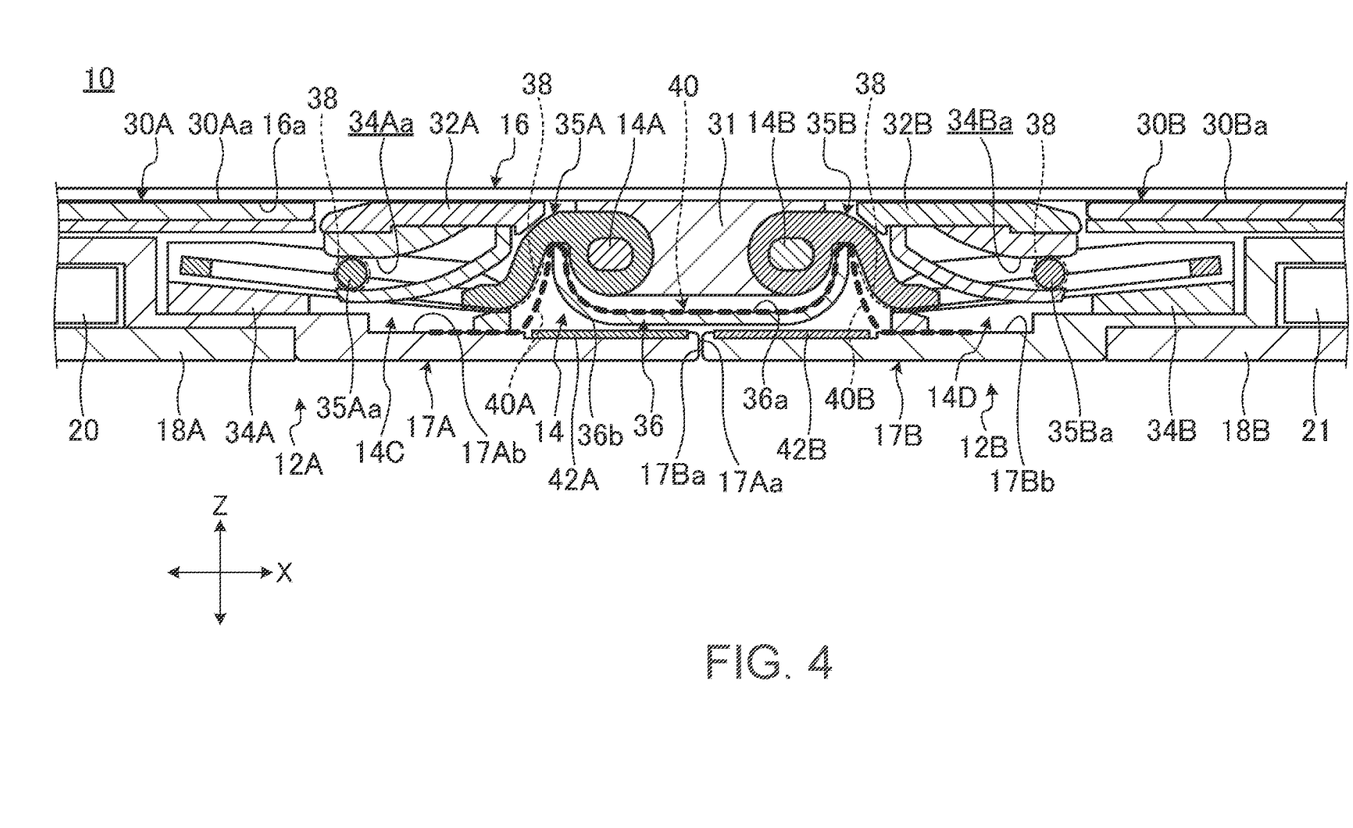
FIG. 4 is a schematic cross-sectional view taken along a line IV-IV in FIG. 3.
Figure 5:
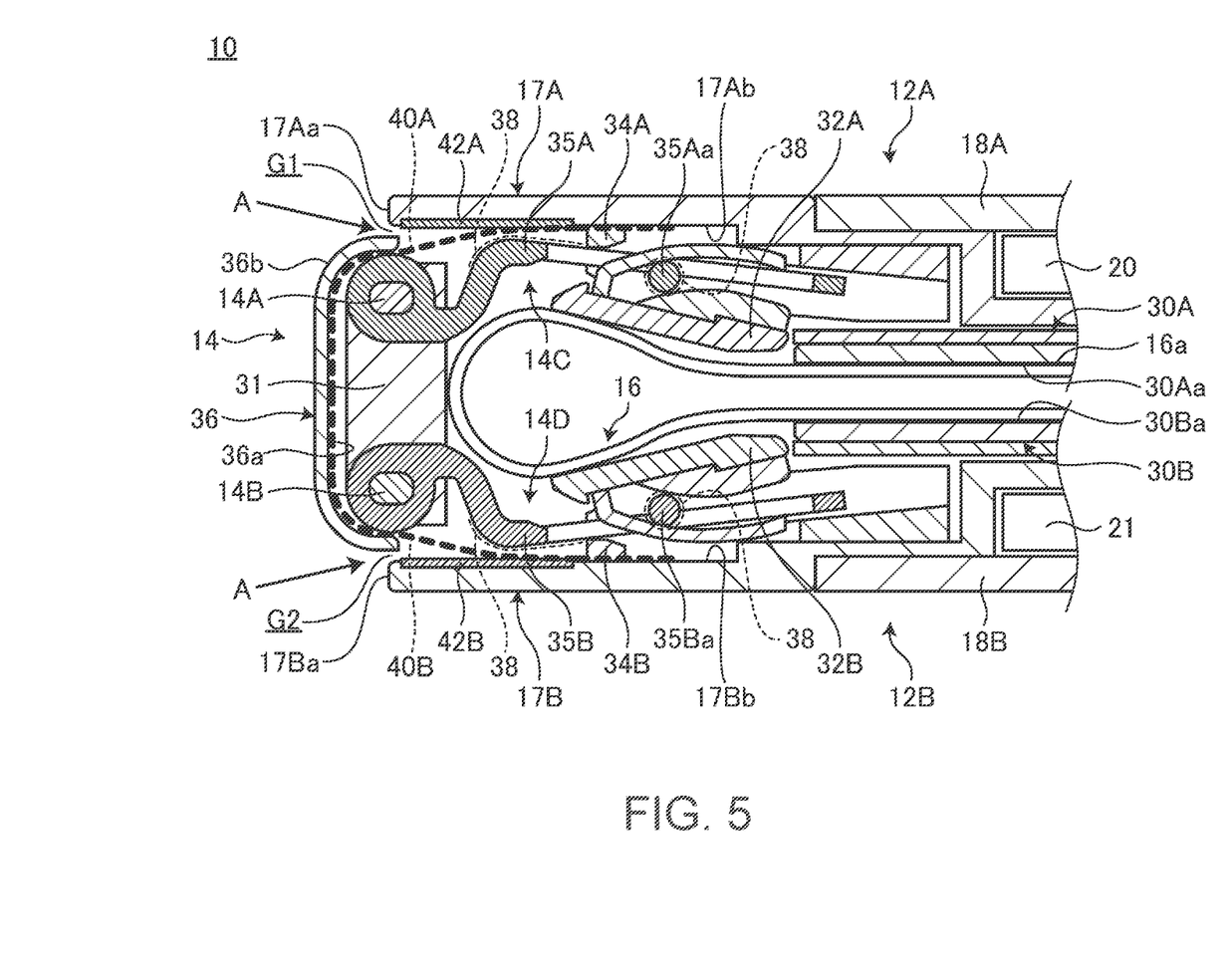
FIG. 5 is a schematic cross-sectional view illustrating a state in which the electronic apparatus illustrated in FIG. 4 is in the 0-degree posture.

FIG. 4 is a schematic cross-sectional view taken along a line IV-IV in FIG. 3. FIG. 5 is a schematic cross-sectional view illustrating a state in which the electronic apparatus 10 illustrated in FIG. 4 is in the 0-degree posture.

In the 0-degree posture illustrated in FIGS. 1 and 4, the chassis 12A and 12B are in a state of being folded in half. The display 16 is a sheet-shaped flexible display having flexibility, and is constituted of, for example, an organic EL. In the 0-degree posture, the display 16 is disposed so that a region R1 on the side of the first chassis 12A and a region R2 on the side of the second chassis 12B illustrated in FIG. 2 face each other, and a bending region R3 which is a boundary region between the regions R1 and R2 is bent in an arc shape. In the 180-degree posture illustrated in FIGS. 2 and 5, the chassis 12A and 12B are disposed side by side with each other. At this time, the display 16 has the regions R1 and R2 and the bending region R3 disposed side by side on a XY plane, and forms a flat plate shape as a single sheet.

In the display 16, the region R1 is relatively fixed with respect to the first chassis 12A, and the region R2 is relatively fixed with respect to the second chassis 12B. Specifically, the rear surface 16a of the region R1 is fixed to the first chassis 12A via a first plate 30A, and the rear surface 16a of the region R2 is fixed to the second chassis 12B via a second plate 30B. FIG. 3 illustrates a state in which the display 16 and the plates 30A and 30B are removed.

As illustrated in FIGS. 4 and 5, the plates 30A and 30B are disposed on the left and right with the hinge device 14 interposed therebetween, and support the rear surface 16a of the display 16 with respective front surfaces 30Aa and 30Ba. The rear surface 16a of the display 16 has the region R1 adhesively fixed to the front surface 30Aa of the first plate 30A and the region R2 adhesively fixed to the front surface 30Ba of the second plate 30B. The plates 30A and 30B have, for example, a configuration to include a carbon fiber reinforced resin plate in which carbon fibers are impregnated with a matrix resin such as epoxy resin, and a metal frame made of a magnesium alloy surrounding an outer periphery of the rear surface of the carbon fiber reinforced resin plate.

The bending region R3 of the display 16 is relatively movable with respect to the chassis 12A and 12B. In the 180-degree posture, the rear surface 16a of the bending region R3 is supported by the hinge device 14 (see FIG. 4). In the 0-degree posture, the bending region R3 is bent in an arc shape, a portion of the rear surface 16a is supported by the hinge device 14, and most of the rear surface 16a is separated from the hinge device 14 (see FIG. 5).

As illustrated in FIGS. 3 to 5, the hinge device 14 of the present embodiment has a hinge base 31, a first support plate 32A, and a second support plate 32B.

The hinge base 31 is provided at a position straddling the end portions 17Aa and 17Ba, and extends over the substantially entire length in the Y direction along the end portions 17Aa and 17Ba. The hinge base 31 is a block-shaped component formed of a metal material such as aluminum. The hinge base 31 supports two hinge shafts 14A and 14B aligned in the X direction in the 180-degree posture.

A first end portion of a first link arm 33A is rotatably supported around an axis on the first hinge shaft 14A (see FIG. 3). A second end portion of the first link arm 33A is connected to a first bracket 34A by using a rotation shaft to be relatively rotatable. A first end portion of a first support arm 35A is further rotatably supported around an axis on the first hinge shaft 14A. A second end portion of the first support arm 35A is connected to the first bracket 34A by using a rotation shaft to be relatively rotatable. The first support arm 35A is aligned with the first link arm 33A in the Y direction. The first bracket 34A is fixed to an inner surface 17Ab of the first chassis member 17A by screws or the like.

A first end portion of a second link arm 33B is rotatably supported around an axis on the second hinge shaft 14B (see FIG. 3). A second end portion of the second link arm 33B is connected to a second bracket 34B by using a rotation shaft to be relatively rotatable. A first end portion of a second support arm 35B is further rotatably supported around an axis on the second hinge shaft 14B. A second end portion of the second support arm 35B is connected to the second bracket 34B by using a rotation shaft to be relatively rotatable. The second support arm 35B is aligned with the second link arm 33B in the Y direction. The second bracket 34B is fixed to an inner surface 17Bb of the second chassis 12B by screws or the like.

As illustrated in FIG. 3, the hinge device 14 has a plurality of first movable portions 14C in which the one first link arm 33A and the one first support arm 35A are connected to the one first bracket 34A. The first movable portions 14C are disposed with a gap from each other along the Y direction, which is a longitudinal direction of the hinge base 31. That is, the first movable portion 14C is intermittently connected along the longitudinal direction of the hinge base 31. The second bracket 34B, the second link arm 33B, and the second support arm 35B also form a second movable portion 14D that is the same as the first movable portion 14C.

As the first arm member that rotatably connects the hinge base 31 and the first bracket 34A, only one of the first link arm 33A and the first support arm 35A may be used, or both may be used as in the present embodiment, or an arm member of the base may be added. Similarly, as the second arm member that rotatably connects the hinge base 31 and the second bracket 34B, only one of the second link arm 33B and the second support arm 35B may be used, or both may be used as in the present embodiment, or an arm member of the base may be added.

As a result, in the hinge device 14, the brackets 34A and 34B are relatively rotatably connected via the hinge base 31, that is, the chassis 12A and 12B are relatively rotatably connected. A gear mechanism for synchronizing the rotation operation between the chassis 12A and 12B, a torque mechanism for applying a predetermined rotational torque to the rotation operation between the chassis 12A and 12B, or the like are also provided inside the hinge base 31.

By the way, in the movable portions 14C and 14D, the link arms 33A and 33B and the support arms 35A and 35B rotate or slide with respect to the brackets 34A and 34B. Since the metal components slide together in this manner, a lubricant 38 such as grease is appropriately applied to portions of the movable portions 14C and 14D (see FIG. 4). In the present embodiment, in particular, the support arms 35A and 35B rotate while metal shafts 35Aa and 35Ba slide in slider grooves 34Aa and 34Ba formed on the brackets 34A and 34B. Therefore, the lubricant 38 is essential for a sliding portion between the metal shafts 35Aa and 35Ba and the slider grooves 34Aa and 34Ba. The lubricant 38 in this portion also flows out and adheres to components around the portion, for example, the front surfaces of the support arms 35A and 35B or the like. Of course, the lubricant 38 is applied to various portions of the hinge device 14 in addition to each sliding portion of the link arms 33A and 33B.

As illustrated in FIGS. 1, 4, and 5, a rear cover component 36 is attached to the outer surface of the hinge base 31. The rear cover component 36 is a plate having a substantially U-shaped cross section that matches the outer surface shape of the hinge base 31. The rear cover component 36 is formed of a heat conductive material, for example, an aluminum alloy, stainless steel, or the like. The rear cover component 36 is a decorative cover to improve the outer surface quality. The flexible boards 26 to 28 pass between the hinge base 31 and the rear cover component 36 at a position straddling the end portions 17Aa and 17Ba.

In the 180-degree posture illustrated in FIG. 4, the hinge base 31 is accommodated in the chassis 12A and 12B, and straddles the end portions 17Aa and 17Ba close to each other in the X direction. In the 0-degree posture illustrated in FIG. 5, the hinge base 31 is disposed to fill an opening formed between the end portions 17Aa and 17Ba that are greatly separated from each other. At this time, deterioration of an appearance design of the folded electronic apparatus 10 is prevented by disposing the rear cover component 36 to the outermost surface (see FIG. 1). In addition to the 0-degree posture, the rear cover component 36 can cover the opening formed between the end portions 17Aa and 17Ba, for example, in the 90-degree posture or the like.

For example, when the hinge base 31 is not configured to extend in the Y direction as illustrated in FIG. 3 but is configured with one or a plurality of small piece components, or the like, the rear cover component 36 may be supported by each of the chassis members 17A and 17B, separately from the hinge device 14. That is, the rear cover component 36 may not necessarily be a constituent element of the hinge device 14, and in short, when the opening formed between the end portions 17Aa and 17Ba can be covered, the configuration and mounting mode are not limited. However, in the present embodiment, the rear cover component 36 is a constituent component of the hinge device 14, so that an individual configuration or mechanism to attach the rear cover component 36 to the chassis members 17A and 17B is unnecessary, and the configuration can be simplified.

As illustrated in FIGS. 3 to 5, the support plates 32A and 32B are plates formed of a metal material such as aluminum, and have bilaterally symmetrical shapes. The support plates 32A and 32B are provided on the sides of the inner surfaces 17Ab and 17Bb of the chassis members 17A and 17B, and extend over the substantially entire length in the Y direction along the end portions 17Aa and 17Ba.

The first support plate 32A is disposed between the first plate 30A and the hinge base 31. The first support plate 32A has an edge portion on the side of the first plate 30A, which is connected to the first bracket 31A to be relatively rotatable via the rotation shaft. The first support plate 32A has an edge portion on the side of the hinge base 31, which is relatively movable with respect to the hinge base 31. The configuration of the second support plate 32B and the mounting structure or the like to the second plate 30B and the hinge base 31 may be bilaterally symmetrical with the configuration and the mounting structure or the like of the first support plate 32A.

The support plates 32A and 32B swing according to the rotation operation of the chassis 12A and 12B. In the 180-degree posture, the support plates 32A and 32B support the rear surface 16a of the bending region R3 of the display 16 by the front surfaces of the support plates 32A and 32B. In the angular postures other than 180 degrees, the support plates 32A and 32B come into contact with the display 16 in a state in which a gap is provided between the support plates 32A and 32B and the display 16 or with a slight force that does not deform the display 16 (see FIG. 5).

By the way, in the electronic apparatus 10, it is necessary to avoid the rear cover component 36 from interfering with the chassis members 17A and 17B during the rotation operation between the chassis 12A and 12B.

Therefore, for example, in the 0-degree posture illustrated in FIG. 5, it is not possible for the rear cover component 36 to avoid the formation of slight gaps G1 and G2 with respect to the chassis members 17A and 17B, respectively. As a result, in the electronic apparatus 10, the internal components are seen through each of the gaps G1 and G2 (see a viewpoint A in FIG. 5), and the appearance quality is deteriorated. In particular, the link arms 33A and 33B, the support arms 35A and 35B, the brackets 34A and 34B, or the like constituting the hinge device 14 are all metal components formed of stainless steel or the like and have a metal gloss. Further, since all of these metal components are at positions facing the gaps G1 and G2 and reflect light that has passed through the gaps G1 and G2, the metal components are more noticeable.

Figure 6A:
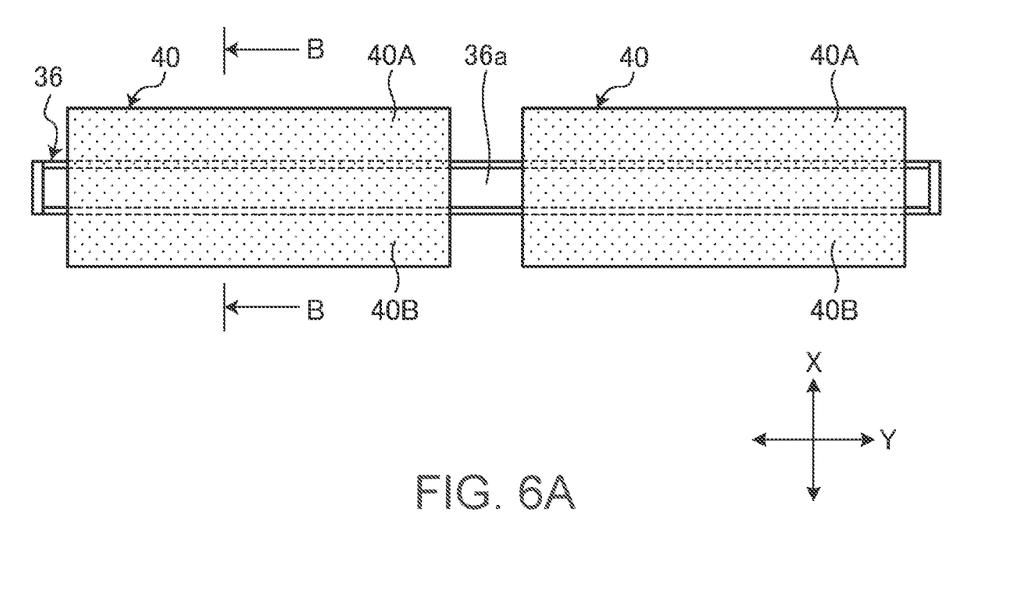
FIG. 6A is a schematic plan view illustrating a state in which a sheet member is attached to an inner surface of a rear cover component.
Figure 6B:
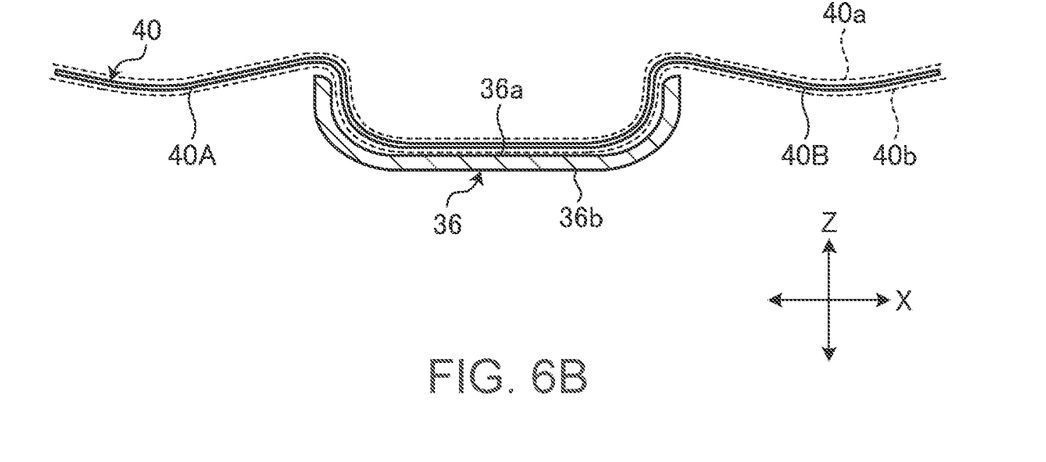
FIG. 6B is a schematic cross-sectional view taken along a line B-B in FIG. 6A.

Therefore, the electronic apparatus 10 of the present embodiment includes a sheet member 40 that functions as a blindfold member that prevents the internal components from being visually recognized from the gaps G1 and G2. FIG. 6A is a schematic plan view illustrating a state in which the sheet member 40 is attached to an inner surface 36a of the rear cover component 36. FIG. 6B is a schematic cross-sectional view taken along a line B-B in FIG. 6A. In addition, in FIGS. 4 and 5, the sheet member 40 is illustrated by a thick broken line to be clearly indicated and to be distinguished from the other components.

As illustrated in FIGS. 4 to 6B, the sheet member 40 is provided to straddle between the rear cover component 36, and the inner surface 17Ab of the first chassis member 17A and the inner surface 17Bb of the second chassis member 17B, and covers the gaps G1 and G2. The sheet member 40 of the present embodiment is formed of a single sheet, and extends from the inner surface 17Ab of the first chassis member 17A to the inner surface 17Bb of the second chassis member 17B by passing through the rear cover component 36.

Hereinafter, with respect to the portion of the sheet member 40, a description is made such that a portion that is provided to straddle between the rear cover component 36 and the inner surface 17Ab of the first chassis member 17A and covers the gap G1 is referred to as a first sheet portion 40A, and a portion that is provided to straddle between the rear cover component 36 and the inner surface 17Bb of the second chassis member 17B and covers the gap G2 is referred to as a second sheet portion 40B. The sheet member 40 may be configured such that each of the first sheet portion 40A and the second sheet portion 40B is a separate sheet. However, the sheet member 40 is easier to be positioned and fixed to the rear cover component 36 in a case of being formed of a single sheet structure than in a case of forming the sheet portions 40A and 40B as separate sheets, so that there is an advantage that the manufacturing efficiency is better.

As illustrated in FIGS. 4 and 5, the central portion of the sheet member 40 in the X direction is fixed to the inner surface 36a of the rear cover component 36, the end thereof on the side of the first chassis member 17A is interposed and held between the first bracket 34A and the inner surface 17Ab of the first chassis member 17A, and the end thereof on the side of the second chassis member 17B is interposed and held between the second bracket 34B and the inner surface 17Bb of the second chassis member 17B.

The sheet member 40 has flexibility, and the width dimension in the X direction is set to have a dimension having a certain margin (sag). As a result, the sheet member 40 does not interfere with the rotation operation between the chassis members 17A and 17B and covers the gaps G1 and G2 while following the corresponding rotation operation and being deformed.

The material of the sheet member 40 is not limited as long as the sheet member 40 can cover the gaps G1 and G2 and has flexibility. Examples of the material of the sheet member 40 can include nonwoven fabric, woven fabric, knitted fabric, resin sheet, resin film, or the like. However, the sheet member 40 slides with the surrounding components in accordance with the rotation operation between the chassis members 17A and 17B. In consideration of the generation of abnormal noise such as a rustling noise that occurs during the sliding, durability, or the like, the sheet member 40 of the present embodiment uses, for example, a nonwoven fabric formed of PET resin or PP resin and having a thickness of 0.15 mm. The sheet member 40 is preferably colored in a dark color such as black so that the sheet member 40 does not stand out behind the gaps G1 and G2.

As illustrated in FIGS. 6A and 6B, the sheet member 40 is fixed to the inner surface 36a of the rear cover component 36, for example, with an adhesive, double-sided tape, or the like, and both side portions thereof in the X direction protrude to the left and right in the shape of blades, respectively. In a case where the first sheet portion 40A and the second sheet portion 40B are formed of separate sheets, each of the sheet portions 40A and 40B may be fixed to the inner surface 36a.

As illustrated in FIGS. 3 and 6B, the sheet member 40 may be configured to be divided into two or more in a longitudinal direction (Y direction) of the rear cover component 36. As a result, the Y dimension for a single sheet of the sheet member 40 can be shortened, and the efficiency of the fixing work to the rear cover component 36 is improved.

At this time, the sheet member 40 is preferably provided in the longitudinal direction of the rear cover component 36 in a range in which at least the flexible boards 26 to 28 are not disposed. That is, the flexible boards 26 to 28 can be formed in black, for example, and can cover the gaps G1 and G2 in the same manner as the sheet member 40. Therefore, for example, as illustrated in FIG. 3, the sheet member 40 may have a two-sheet structure arranged in the Y direction, and may be configured such that a gap between the two sheet members 40 and 40 is complemented by the flexible board 27. Then, since the usage amount of the sheet member 40 can be reduced, the cost can be reduced, and since the Y dimension of the sheet member 40 can be shortened, the fixing work to the rear cover component 36 also becomes easier.

Therefore, the electronic apparatus 10 can cover the gaps G1 and G2 between the rear cover component 36 and the chassis members 17A and 17B by the sheet member 40. Therefore, the electronic apparatus 10 can prevent the internal components from being exposed through the gaps G1 and G2, and can suppress deterioration in appearance quality.

In particular, in the sheet member 40 of the present embodiment, one end side is fixed to the inner surface 36a of the rear cover component 36, and the other end side is interposed and held between the brackets 34A and 34B and the inner surfaces 17Ab and 17Bb of the chassis members 17A and 17B. Therefore, the sheet member 40 can more reliably cover the metal components such as the brackets 34A and 34B and the arms 33A, 33B, 35A, and 35B connected to the brackets 34A and 34B. As a result, it is possible to prevent the metal gloss of the metal components from reflecting light that has passed through the gaps G1 and G2, and deterioration in appearance quality can be further suppressed.

The sheet member 40 of the present embodiment has a function other than the blindfold that covers the gaps G1 and G2.

As described above, the sheet member 40 is installed to straddle between the rear cover component 36 and the inner surfaces 17Ab and 17Bb. In other words, the first sheet portion 40A covers the arms 33A and 35A, which are the first arm members, and the first bracket 34A from the side of the inner surface 17Ab (see FIGS. 4 and 5). Similarly, the second sheet portion 40B covers the arms 33B and 35B, which are the second arm members, and the second brackets 34B from the side of the inner surface 17Bb.

That is, the sheet member 40 is interposed between the movable portions 14C and 14D of the hinge device 14 and the inner surfaces 17Ab and 17Bb of the chassis members 17A and 17B. Therefore, the sheet member 40 can prevent the lubricant 38 applied to the movable portions 14C and 14D from adhering to the inner surfaces 17Ab and 17Bb and adhering to an outer surface 36b of the rear cover component 36 in the 180-degree posture illustrated in FIG. 4. As a result, the electronic apparatus 10 can prevent a case in which the lubricant 38 adheres to the outer surface 36b of the rear cover component 36 and this is exposed on the appearance in the 0-degree posture illustrated in FIG. 5 to deteriorate the appearance quality and give discomfort to a user who touches the rear cover component 36.

By the way, as described above, the sheet member 40 is configured with, for example, a nonwoven fabric. Therefore, the lubricant 38 permeates through fine hole portions formed in the nonwoven fabric, and there is a possibility that the lubricant 38 adheres to the outer surface 36b of the rear cover component 36. Therefore, as illustrated in FIG. 6B, in order to prevent the permeation of the lubricant 38 such as grease, the sheet member 40 is preferably provided with coatings 40a and 40b, which have oil-proof performance, on the front surface.

The coatings 40a and 40b may be, for example, an oil-proof coating or a water-repellent coating, and may be any coatings that can suppress the permeation of the lubricant 38 in the sheet member 40. For the coating, at least the coating 40a on a front surface of the hinge device 14 facing the side of the movable portions 14C and 14D may be provided. From the viewpoint of manufacturing efficiency, the coatings 40a and 40b of the present embodiment are applied to both surfaces of the sheet member 40 because, for example, the sheet member 40 is provided by immersing the sheet member 40 in a container containing a liquid coating agent.

Reference numerals 42A and 42B in FIGS. 4 and 5 are heat conductive members provided on the inner surfaces 17Ab and 17Bb. The heat conductive members 42A and 42B are a heat conductive sheet such as a graphite sheet or a heat conductive cushion such as a heat transfer rubber. The heat conductive members 42A and 42B thermally connect the chassis members 17A and 17B on the left and right via the rear cover component 36 in the 180-degree posture, and moves the heat on the side of the first chassis 12A that becomes high temperature due to the heat generated by the CPU 20a or the like, to the side of the second chassis 12B. As described above, the electronic apparatus 10 of the present embodiment has a structure in which the lubricant 38 is more easily adhered to the outer surface 36b of the rear cover component 36 by the action of the heat conductive members 42A and 42B, and thus the anti-adhesion action of the lubricant 38 by the sheet member 40 becomes more effective. The heat conductive members 42A and 42B may be omitted.

The present invention is not limited to the above-described embodiments, and modification is freely possible without departing from the gist of the present invention.

In the above, although the electronic apparatus 10 that is capable of being folded in half like a book is exemplified, the present invention can be applied to, in addition to a configuration of folding the same-shaped chassis in half, for example, various configurations, such as a double-door configuration in which small chassis are foldably connected to the left and right edge portions of a large chassis, respectively, an S-shaped folding configuration in which chassis with different folding directions are respectively connected to the left and right edge portions of one chassis, and a J-shaped folding configuration in which a small chassis is foldably connected to one of the left and right edge portions of a large chassis, and the number of chassis to be connected may be four or more.

The invention claimed is:

1. An electronic apparatus comprising:
   a first chassis member that has an inner surface;
   a second chassis member that has another inner surface and is adjacent to the first chassis member;
   a hinge device that rotatably connects the first chassis member and the second chassis member for rotation between a first posture in which the first chassis member and the second chassis member are stacked to overlap each other in a surface normal direction and a second posture in which the first chassis member and the second chassis member are aligned in a direction perpendicular to the surface normal direction;
   a rear cover component that extends along a first end portion of the first chassis member adjacent to the second chassis member and that extends along a second end portion of the second chassis member adjacent to the first chassis member, wherein the rear cover component fills a space between the first end portion and the second end portion in the first posture, and straddles the first end portion and the second end portion in the second posture; and
   a sheet member that is flexible and is between the rear cover component and the inner surface of the first chassis member and the inner surface of the second chassis member, and covers a gap between the rear cover component and the first end portion and another gap between the rear cover component and the second end portion, wherein:
   the hinge device has:
     a first metal bracket fixed to the inner surface of the first chassis member, and
     a second metal bracket that is rotatable with respect to the first bracket and is fixed to the another inner surface of the second chassis member, and
   the sheet member is fixed to the rear cover component and has an end on a side of the first chassis member and is between the first bracket and the inner surface of the first chassis member and has another end on a side of the second chassis member and is between the second bracket and the another inner surface of the second chassis member.

2. The electronic apparatus according to claim 1, wherein the hinge device further has:
   a first movable portion on the inner surface side of the first chassis member and coated with a lubricant, and
   a second movable portion on the another inner surface side of the second chassis member and coated with the lubricant, and
   the sheet member is oil-proof and is between the first movable portion and the inner surface of the first chassis member and is between the second movable portion and the another inner surface of the second chassis member.

3. The electronic apparatus according to claim 2, further comprising:
   a display over the first chassis member and the second chassis member and has a bending region that is bent according to relative rotation of the first chassis member and the second chassis member, wherein:
   the hinge device further has:
     a hinge base that extends along the first end portion and the second end portion, that straddles the first end portion and the second end portion in the second posture, and supports a rear surface of the display,
     a first arm member that connects the hinge base and the first bracket, and
     a second arm member that connects the hinge base and the second bracket, and
   the sheet member is between the inner surface of the first chassis member and the first arm member and is between the another inner surface of the second chassis member and the second arm member.

4. The electronic apparatus according to claim 1, wherein the sheet member is a nonwoven fabric.

5. The electronic apparatus according to claim 1, wherein the sheet member has:
- a first sheet portion that is between the rear cover component and the inner surface of the first chassis member and covers the gap between the rear cover component and the first end portion, and
- a second sheet portion that is between the rear cover component and the another inner surface of the second chassis member and covers the another gap between the rear cover component and the second end portion, and the first sheet portion and the second sheet portion are formed of a single sheet and extend from the inner surface of the first chassis member to the another inner surface of the second chassis member by passing through the rear cover component.

6. The electronic apparatus according to claim 1, wherein the sheet member has:
- a first sheet portion that is between the rear cover component and the inner surface of the first chassis member and covers the gap between the rear cover component and the first end portion, and
- a second sheet portion that is formed separately from the first sheet portion, is between the rear cover component and the another inner surface of the second chassis member, and covers the another gap between the rear cover component and the second end portion.

7. The electronic apparatus according to claim 1, further comprising:
- a flexible board that straddles the first chassis member and the second chassis member by passing through the rear cover component, wherein:

the sheet member is disposed in a longitudinal direction of the rear cover component and in an area in which at least the flexible board is not disposed.

* * * * *